United States Patent [19]

Hattori

[11] Patent Number: 4,912,670
[45] Date of Patent: Mar. 27, 1990

[54] PRINTER WHICH SEQUENTIALLY PRINTS DATA FROM NON-OVERWRITABLE THEN OVERWRITABLE PRINTER BUFFER REGIONS BUT REPRINTS FROM NON-OVERWRITABLE REGIONS

[75] Inventor: Yuji Hattori, Nagoya, Japan

[73] Assignee: Brother Kogyo Kabushiki Kaisha, Japan

[21] Appl. No.: 19,260

[22] Filed: Feb. 26, 1987

[30] Foreign Application Priority Data

Mar. 10, 1986 [JP] Japan .................. 61-52987

[51] Int. Cl.⁴ .................. G06F 3/12; G06F 13/10
[52] U.S. Cl. .................. 364/900; 364/957;
364/943.9; 364/930; 364/235.0; 364/239.0;
364/246.3; 400/62
[58] Field of Search ... 364/200 MS File, 900 MS File;
400/62

[56] References Cited

U.S. PATENT DOCUMENTS

| | | | |
|---|---|---|---|
| 3,810,109 | 5/1974 | Morris | 364/200 |
| 3,959,776 | 5/1976 | Morley | 364/900 |
| 4,250,560 | 2/1981 | Dethloff | 364/900 |
| 4,498,144 | 2/1985 | Haneda | 364/900 |
| 4,498,150 | 2/1985 | Gaudet et al. | 400/62 |
| 4,585,360 | 4/1986 | Ueda | 364/900 |
| 4,592,011 | 5/1986 | Mantellina et al. | 364/900 |
| 4,599,689 | 7/1986 | Berman | 364/200 |
| 4,692,894 | 9/1987 | Bemis | 364/900 |
| 4,745,560 | 5/1988 | Decker et al. | 364/518 |
| 4,774,590 | 9/1988 | Haganuma et al. | 358/280 |
| 4,775,932 | 10/1988 | Oxley et al. | 364/200 |
| 4,805,109 | 2/1989 | Kroll | 364/900 |

FOREIGN PATENT DOCUMENTS 59-71590  4/1984  Japan .
59-142180 8/1984  Japan .

*Primary Examiner*—Archie E. Williams, Jr.
*Assistant Examiner*—Eric Coleman
*Attorney, Agent, or Firm*—Oliff & Berridge

[57] ABSTRACT

A printer has a printing mechanism for printing on printing paper in accordance with data stored in a buffer memory which is divided into a non-overwrite memory region and an overwrite memory region. The data entered from an external device is first stored in the non-overwrite memory region of the buffer memory. If the data in the non-overwrite memory region exceeds the storage capacity during printing, the excess data is stored in the overwrite memory region. When the data stored in the overwrite memory region exceeds the storage capacity, the printer overwrites subsequent data entered from the external device onto the previous data stored therein. Moreover, during reprinting, the data in the non-overwrite memory region of the buffer memory is read to activate the printing mechanism.

5 Claims, 4 Drawing Sheets

PRINTER WHICH SEQUENTIALLY PRINTS DATA FROM NON-OVERWRITABLE THEN OVERWRITABLE PRINTER BUFFER REGIONS BUT REPRINTS FROM NON-OVERWRITABLE REGIONS

BACKGROUND OF THE INVENTION

1. Technical Field

The present invention relates to a printer having a buffer memory whose storage region is divided into a non-overwrite memory region and an overwrite memory region.

2. Prior Art

Generally, printing data such as character data that is entered from an external device is initially stored in a buffer memory. In the case of a printer that reprints in accordance with the stored data, should an excess of data beyond the storage capacity be received, the excess data is overwritten on the first part of the data that was previously stored, or the reprinting function itself is canceled, as described in a copending U.S. application Ser. No. 178,856 filed Apr. 8, 1988 now U.S. Pat. No. 4825405 which is a continuation of U.S. Ser. No. 008,096 filed Jan. 23, 1987 now abandoned which in turn is a continuation of U.S. Ser. No. 541,916 now abandoned filed Oct. 4, 1983 which has been assigned to the same assignee as the present application.

However, in the former case described above, the first part of the stored data can not be reprinted, resulting in that reprinting itself becomes meaningless and in the latter case, reprinting itself can not be executed.

SUMMARY OF THE INVENTION

A first object of the present invention is to provide an improved printer which can print a first part of the stored data during reprinting even when the data entered from the external device exceeds the storage capacity of the buffer memory.

A second object of the invention is to provide the printer which can print at least once in accordance with all the data when the entered data from the external device into the non-overwrite memory region exceeds the storage capacity.

A third object of the invention is to improve the reprinting performance of the printer having a copy function.

A fourth object of the invention is to prevent the function of the external device from stopping while entering the printing data therefrom in the printer having a copy function.

A fifth object of the invention is to prevent the first part of the data from being overwritten and the data from being printed halfway and to print the data from the beginning even when data exceeding the printer's storage capacity is entered in a printer having a copy function during reprinting.

A printer having a printing mechanism for printing on printing paper in accordance with the data stored in the buffer memory comprises: dividing means for dividing the buffer memory into a non-overwrite memory region and an overwrite memory region, writing means for storing data entered from the external device into the non-overwrite memory region of the buffer memory and for storing the excess data in the overwrite memory region when the data in the non-overwrite memory region exceeds the storage capacity during printing, overwriting means for overwriting subsequent data entered from the external device onto the previous data stored in the overwrite memory region when the data stored therein exceeds the storage capacity, reading means for reading the data in the non-overwrite memory region of the buffer memory during reprinting and printing control means for activating the printing mechanism in accordance with the data read by the reading means.

According to he present invention, during printing, the data entered from the external device is first stored in the non-overwrite memory region and when the data exceeds the storage capacity, the excess data is subsequently stored in the overwrite memory region by the writing means. When the data stored in the overwrite memory region exceeds the storage capacity, the excess data is overwritten with the subsequent data entered from the external device by the overwriting means. Further, during reprinting, the data stored in the non-overwrite memory region of the buffer memory is read by the reading means and the printing paper is printed by the printing control means in accordance with the read data.

BRIEF DESCRIPTION OF THE DRAWINGS

The above and other objects, features and advantages of the present invention will become more apparent from reading the following description of the preferred embodiments taken in connection with the accompanying drawings in which.

DETAILED DESCRIPTION OF PREFERRED EMBODIMENT

Figure 1:
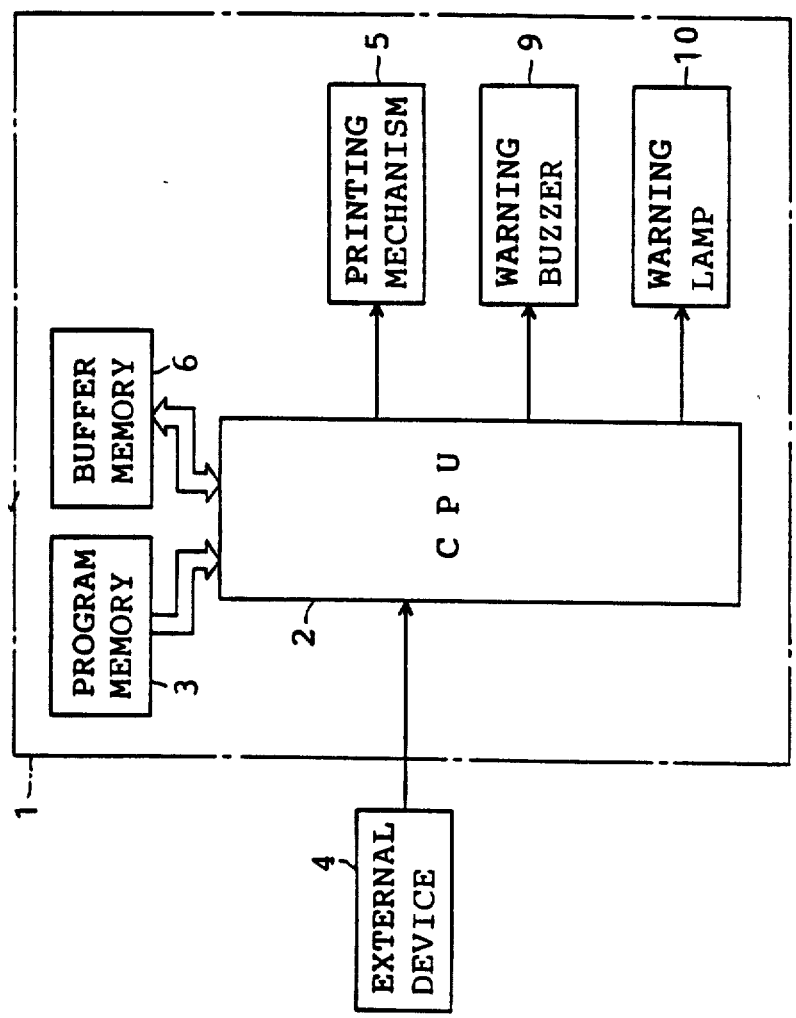
FIG. 1 is a block diagram showing an electronic circuit of a printer embodying the present invention.

A preferred embodiment of the present invention will be described in detail with reference to the accompanying drawings.

Referring to FIGS. 1 thru 4, a printer 1, having both copy and reprinting functions, includes a central processing unit (CPU) 2, which works as means for writing, overwriting, reading and printing control. Thus, the CPU 2 operates in accordance with a control program memorized beforehand in a program memory 3. For example, the control program may follow the printing and reprinting operation diagrammed in FIGS. 5 and 6. When neither printing command signal (NO determination is S1, S11) is entered, CPU 2 proceeds to step S16 to perform another control routine. The CPU 2 is connected to an external device 4 such as a personal computer, thus inputting a printing data from the external device 4. A printing mechanism 5, which is activated by the CPU 2, prints on printing paper 11 according to the printing data entered from the external device 4.

Figure 2:
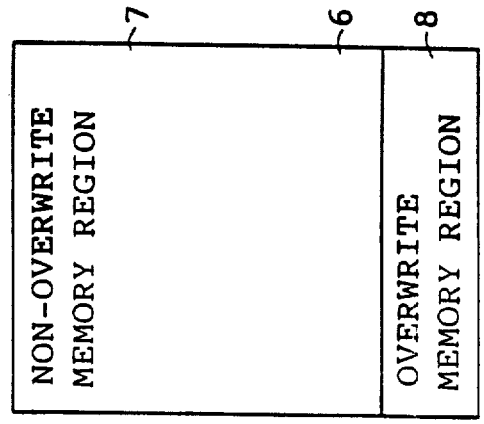
FIG. 2 is a view showing memory regions of a buffer memory.
Figure 3:
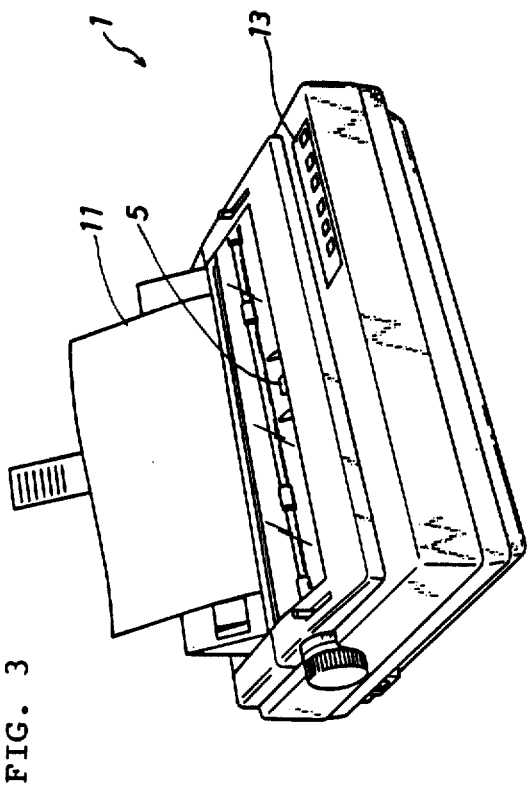
FIG. 3 is a perspective view showing the printer.
Figure 4:
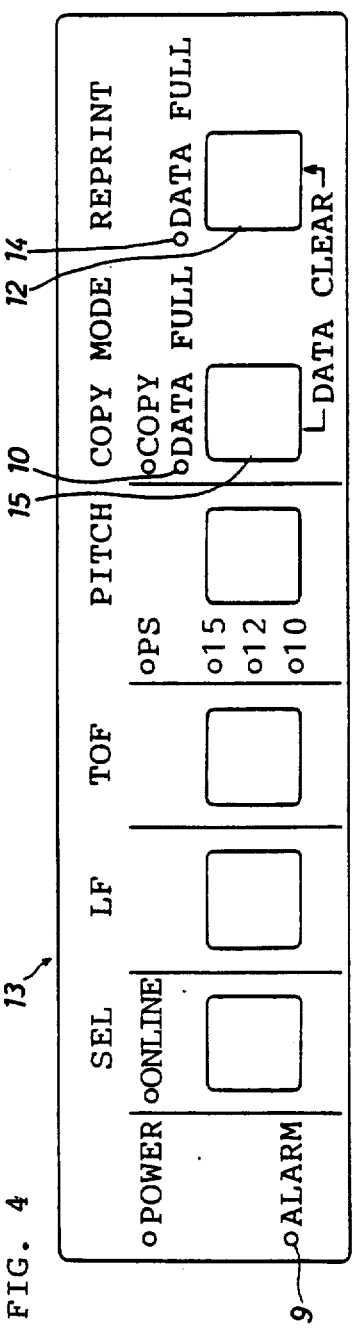
FIG. 4 is an enlarged view showing a panel of the printer.
Figure 5:
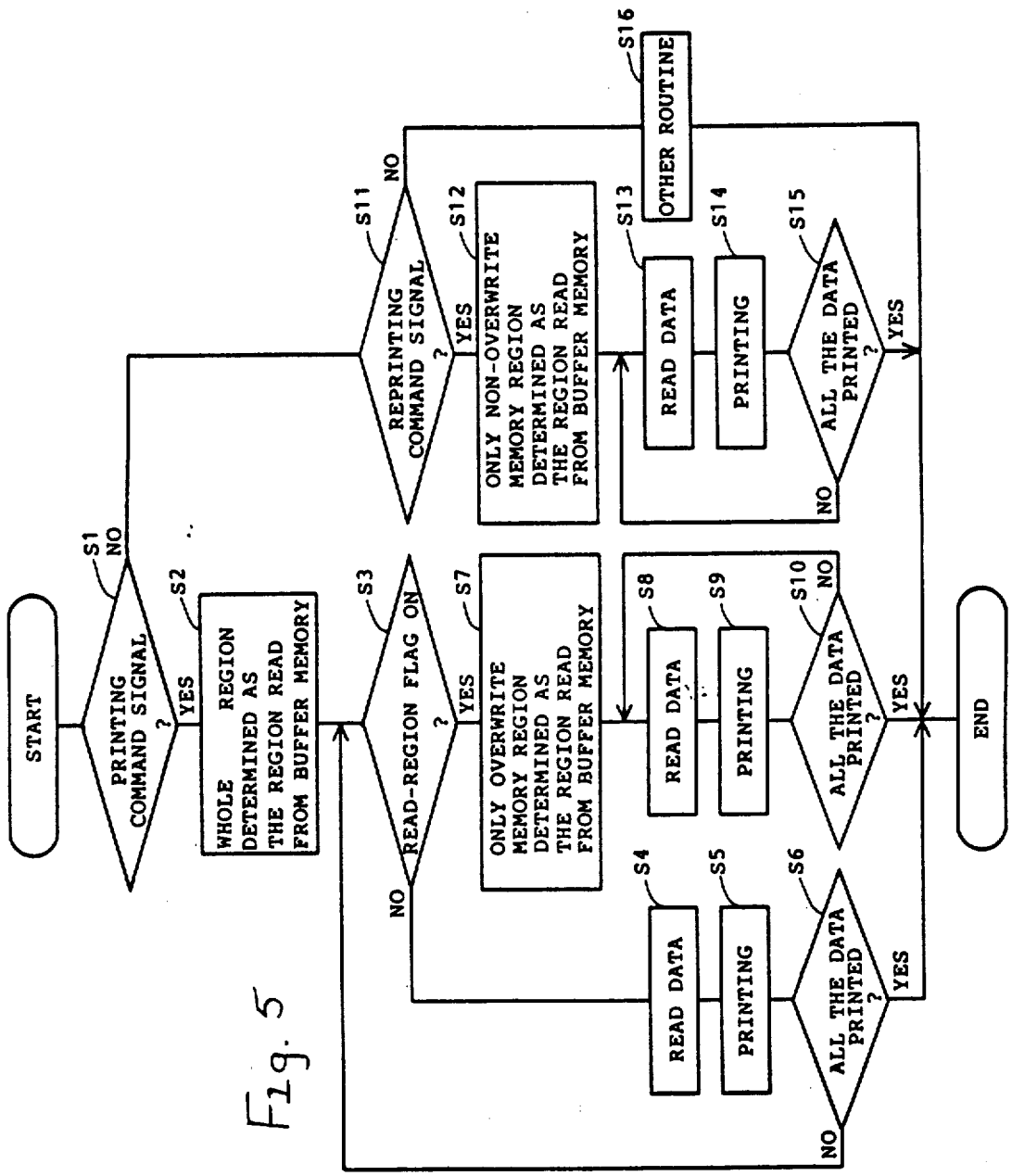
FIG. 5 is a flow diagram illustrating the storing and printing operation of the invention.

In addition, the CPU 2 stores the printing data entered from the external device 4 into a buffer memory 6 in response to a printing command signal output therefrom and activates the printing mechanism 5 according to the printing data as indicated at steps S4-S5, S8-S9, and S13-S14 of FIG. 5. The buffer memory 6 provided in the CPU 2 includes a non-overwrite memory region 7 and an overwrite memory region 8 as shown in FIG. 2 wherein the printing data entered from the external device is first stored in the non-overwrite memory region 7 by the CPU 2. When the printing data exceeds the storage capacity of the non-overwrite memory region 7 of the buffer memory 6, the excess printing data is stored in the overwrite memory region 8 by the CPU 2. When the data in the overwrite memory region 8 exceeds the storage capacity, the previous data stored in the overwrite memory region 8 is overwritten with the subsequent printing data output from the external device 4 by the CPU 2.

After printing, the reprinting function is executed. The CPU 2 activates the printing mechanism 5 in accordance with the printing data previously stored in the non-overwrite memory region 7 of the buffer memory 6 in response to a reprinting command signal output from the external device 4 or from a reprinting switch 12 of a panel 13, as depicted at step S12 of FIG. 5. It is necessary that the printer 1 is set at the deselected condition when the reprinting switch 12 is depressed. The CPU 2 is also connected to a warning buzzer 9 and a warning lamp 10, which are operated when the printing data entered from the external device 4 exceeds the storage capacity of the non-overwrite memory region 7.

Figure 6:
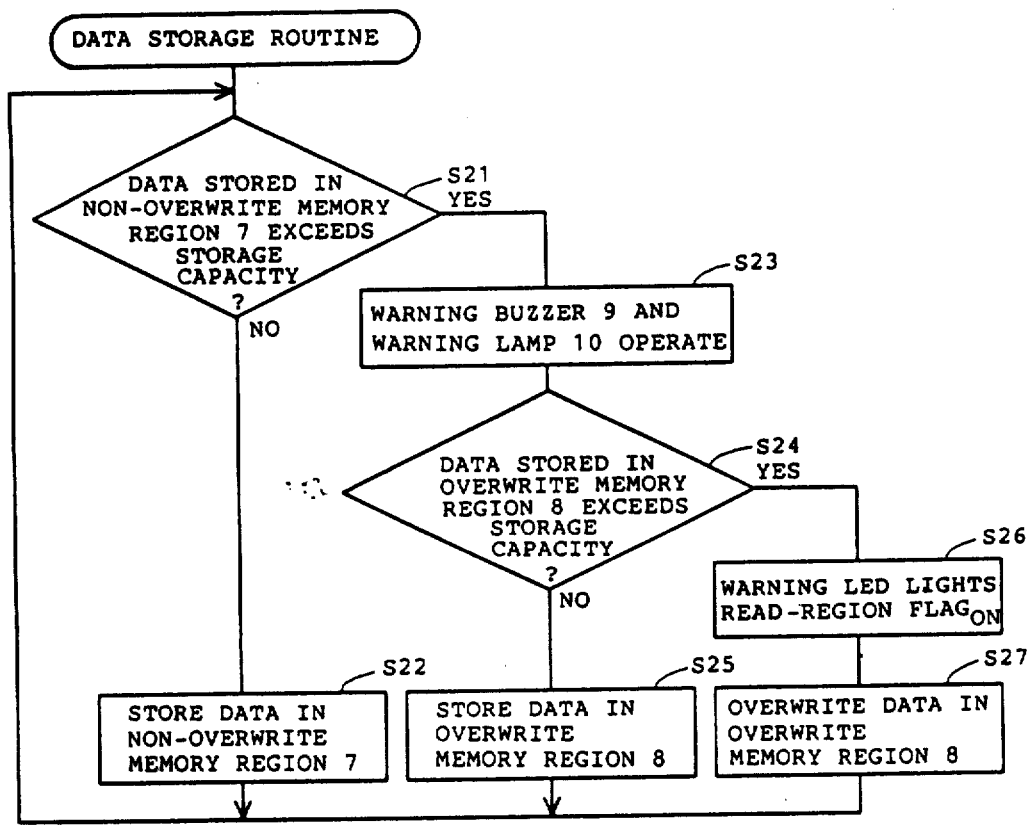
FIG. 6 is a flow chart illustrating the data storage and overwriting routine determining overflow conditions for the storing and printing operation of FIG. 5.

An operation of the printer 1 constructed as above-mentioned will be hereinafter described with reference to the flow charts of FIGS. 5 and 6.

When both the printing command signal and the printing data are entered from the external device (a YES determination in step S1, the CPU 2 stores the printing data) (in the region determined by FIG. 6 at step S2) in the non-overwrite memory region 7 of the buffer memory 6 (a NO determination in step S22 of FIG. 6 and step S3 of FIG. 5) and prints on the printing paper 11 by activating the printing mechanism 5 according to the printing data (as indicated in steps S4-S6). When the amount of the printing data stored in the non-overwrite memory region 7 of the buffer memory 6 exceeds the storage capacity (a YES determination in step S21), the CPU 2 operates the warning buzzer 9 and the warning lamp 10 to warn an operator that the printing data entered from the external device 4 overflows from the non-overwrite memory region 7 (as indicated in step S23 is NO). Simultaneously, the CPU 2 stores the excess printing data in the overwrite memory region 8 (as indicated in step S25 when step S24 is NO) and activates the printing mechanism 5 according to the printing data stored in the overwrite memory region 8 thereafter (steps S4-S6).

When the subsequent printing data entered from the external device 4 exceeds the storage capacity of the overwrite memory region 8 (step S24, YES), the CPU 2 overwrites the subsequent printing data onto the previous printing data stored in the overwrite memory region 8 (step S27) and activates the printing mechanism 5 in accordance with the printing data newly stored in the overwrite memory region 8 (as indicated in steps S7-S10 when step S3 is YES). Moreover, when the printing data entered from the external device 4 into the overwrite memory region 8 exceeds the storage capacity again, the excess printing data is overwritten in the same way as described above and the printing is executed. In this manner, the printing mechanism 5 is activated in accordance with all the printing data entered from the external device 4, and the printing data therefrom is stored in both regions 7 and 8 of the buffer memory 6.

Further, when the printing data entered from the external device 4 first exceeds the storage capacity of the overwrite memory region 8, if a light emitting diode(LED) 14 is lit or there is a warning sound (or a read-region flag, as indicated in step S26), which is different from the warning buzzer 9 in tone, it can be easily determined that the printing data entered from the external device 4 is still under the storage capacity of the buffer memory 6, in other words, whether or not all the printing data entered from the external device 4 is stored in the buffer memory 6.

When the reprinting command signal is entered from the external device 4 or from the reprinting switch 12 of the panel 13 into the CPU 2 (step S1, NO and step S11, YES) after printing in response to the printing command signal output from the external device 4, the CPU 2 prints on the printing paper 11 by activating the printing mechanism 5 according to the printing data previously stored in the non-overwrite memory region 7 in response to the reprinting command signal (steps S12 S15). Namely, the printing paper 11 is reprinted in accordance with the printing data which is first entered to the printer 1 from the external device 4 as described above. With regard to the copy function the data entered in the buffer memory 6 can repeatedly be printed by operating a copy switch 15 of the panel 13.

Accordingly, the storage capacity of the overwrite memory region 8 in the buffer memory 6 may be enough only to promptly print the printing data which is entered to the printer 1 from the external device 4. More specifically, the overwrite memory region 8 has the storage capacity corresponding to at least two lines since the printer 1 bidirectionally prints by the line. Upon completion of printing on one line, the printed data is overwritten by the newly entered data from the external device 4.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

What is claimed is:

1. A printer having a printing mechanism for printing on printing paper comprising:
   printing instruction means for providing a printing command;
   a buffer memory including a non-overwritable memory region and an overwritable memory region;
   writing means responsive to said printing command for storing data entered from an external device into said non-overwritable memory region and for storing subsequent data which overflows from said non-overwritable memory into said overwritable memory region, said writing means overwriting subsequent data which overflows from said overwritable memory region onto said stored data in said overwritable memory region;
   first reading means responsive to said printing command for reading data stored in the buffer memory by first reading said non-overwritable memory region and then reading data stored in said overwritable memory region to print the stored data;

printing means communicating with said first reading means for printing at least once all data entered into said buffer memory onto a printing paper;

reprinting instruction means for providing a reprinting command after completion of said printing of said printing means;

second reading means responsive to said reprinting command for reading data stored in said non-overwritable memory region;

reprinting means communicating with said second reading means for repeatedly printing said data read by said second reading means onto printing paper.

2. A printer according to claim 1 wherein said reprinting instruction means includes a reprinting switch arranged on said printer for supplying said reprinting command to said second reading means.

3. A printer according to claim 1 wherein said reprinting instruction means includes means for supplying said reprinting command from said external device to said second reading means.

4. A printer according to claim 1 wherein said writing means includes a first warning means activated when said data to be stored in said non-overwritable memory region over-flows said non-overwritable memory region.

5. A printer according to claim 1 wherein said writing means includes a second warning means activated when said data to be written into said overwritable memory region overflows from said overwritable memory region.

* * * * *